US011369059B2

(12) United States Patent
Hunt et al.

(10) Patent No.: US 11,369,059 B2
(45) Date of Patent: Jun. 28, 2022

(54) OVERLOAD DETECTION SYSTEM FOR A HARVESTING HEAD

(71) Applicant: CNH Industrial America LLC, New Holland, PA (US)

(72) Inventors: Cory Hunt, Millersville, PA (US); Preston McKinney, Rebersburg, PA (US); Matthew D'Amicantonio, Jonestown, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/602,494

(22) PCT Filed: Apr. 9, 2020

(86) PCT No.: PCT/US2020/027559
§ 371 (c)(1),
(2) Date: Oct. 8, 2021

(87) PCT Pub. No.: WO2020/210555
PCT Pub. Date: Oct. 15, 2020

(65) Prior Publication Data
US 2022/0087101 A1 Mar. 24, 2022

Related U.S. Application Data

(60) Provisional application No. 62/831,975, filed on Apr. 10, 2019.

(51) Int. Cl.
*A01D 75/18* (2006.01)
*A01D 41/14* (2006.01)
(52) U.S. Cl.
CPC ......... *A01D 75/182* (2013.01); *A01D 41/141* (2013.01); *A01D 41/144* (2013.01)

(58) Field of Classification Search
CPC .............. A01D 75/18; A01D 75/182; A01D 34/24–286; A01D 41/141; A01D 41/144
See application file for complete search history.

(56) References Cited

U.S. PATENT DOCUMENTS 6,530,197 B1  3/2003  Christensen et al.
7,191,582 B2  3/2007  Bomleny
(Continued)

FOREIGN PATENT DOCUMENTS

WO   02/102138 A1   12/2002
WO   2020/101886 A1   5/2020

OTHER PUBLICATIONS

International Search Report and Written Opinion for PCT Application No. PCT/US2020/027559 dated Sep. 18, 2020 (12 pages).

*Primary Examiner* — Adam J Behrens
(74) *Attorney, Agent, or Firm* — Patrick Sheldrake; Peter Zacharias

(57) ABSTRACT

An agricultural vehicle header having a base structure, a header wing section, an articulated joint connecting the header wing section to the base structure, an actuator, a load sensor, and a controller. The actuator is configured to move the header wing section relative to the base structure between a wing lowered position and a wing raised position the load sensor is operatively connected to the header wing section. The controller is configured to acquire load sensor data from the load sensor to evaluate a magnitude of a gravitational load on the header wing section, and prevent the actuator from moving the header wing section towards the wing raised position if the magnitude of the gravitational load exceeds a predetermined threshold load value. An agricultural combine having the header and methods of operating the same are also provided.

20 Claims, 4 Drawing Sheets

(56) References Cited

U.S. PATENT DOCUMENTS

| | | |
|---|---|---|
| 7,207,164 B2 | 4/2007 | Bomleny |
| 7,222,475 B2 | 5/2007 | Bomleny et al. |
| 7,430,846 B2 | 10/2008 | Bomleny et al. |
| 7,467,506 B2 | 12/2008 | Lovett et al. |
| 7,520,115 B2 | 4/2009 | Coers et al. |
| 7,661,251 B1 | 2/2010 | Sloan et al. |
| 7,730,700 B2 | 6/2010 | Nathan et al. |
| 7,908,838 B2 | 3/2011 | Hohlfeld et al. |
| 7,992,369 B2 | 8/2011 | Coers et al. |
| 8,863,484 B2 | 10/2014 | Patterson et al. |
| 8,973,342 B2 * | 3/2015 | Ritter .................... A01D 41/145 56/10.2 R |
| 9,345,191 B2 | 5/2016 | Kohlhase et al. |
| 9,668,412 B2 * | 6/2017 | Ritter .................... A01D 41/127 |
| 2014/0250849 A1 * | 9/2014 | Ritter .................... A01D 75/182 56/10.2 R |
| 2016/0338263 A1 * | 11/2016 | Dybro .................. A01D 41/141 |
| 2018/0153102 A1 | 6/2018 | Dunn et al. |
| 2020/0000033 A1 | 1/2020 | Shearer et al. |

\* cited by examiner

OVERLOAD DETECTION SYSTEM FOR A HARVESTING HEAD

BACKGROUND OF THE INVENTION

Agricultural combines are machines that gather crop materials and separate the desirable crop (grain, seeds, etc.) from the discardable material (straw, tailings, etc.). To do so, the combine typically collects all of the crop materials using a system including a header and a feeder. The header gathers a wide swath of materials from the ground, and moves them towards the feeder. The feeder conveys the consolidated crop materials to the threshing and separating system, which separates the desirable crop from the remaining material.

The width of the combine header determines how much crop is collected during each pass of the combine through a field. In some cases, it is desirable to increase the width of the header to improve harvesting efficiency in terms of the number of passes required to completely harvest a given area. However, wider headers can be less effective at following the ground contours than a narrow header, and this can lead to less efficient harvesting of low-growing crops or crops planted on particularly uneven terrain.

To address the problem of undulating terrain, headers have been made with articulated sections. For example, U.S. Pat. Pub. No. 2019/0000014 discloses a combine draper head having a center section and a pivotable "wing" located on each side of the center section. As another example, U.S. Pat. No. 9,992,924 discloses a combine having an articulated header that can be moved to different positions to improve harvesting and also provide a more compact profile during transport. U.S. Pat. Nos. 10,070,575 and 10,165,726 also show combines having headers with pivoting elements.

A potential problem with articulated headers is the possibility that the wings will contact the ground. To prevent such contact, the wings might be supported on caster wheels or the like that extend between each wing and the ground. In other cases, the wings might be supported by a control mechanism, such as one or more single-acting or double-acting hydraulic pistons, to actively control the position of the wing. For example, U.S. Pat. No. 9,668,412 shows an articulated header having wings that are each connected to the center section by a respective pivot and a respective hydraulic piston. Operation of the piston causes the wing to rotate about the pivot to change its angular position relative to the center section and its orientation relative to the ground.

All of the foregoing references and all other references noted in this disclosure are incorporated by reference into this disclosure.

The inventor has determined that articulated headers are subject to potential failure modes that are not adequately addressed by the known art.

This description of the background is provided to assist with an understanding of the following explanations of exemplary embodiments, and is not an admission that any or all of this background information is necessarily prior art.

SUMMARY OF THE INVENTION

In one exemplary embodiment, there is provided a header for an agricultural vehicle. The header includes a base structure, a header wing section, an articulated joint connecting the header wing section to the base structure, an actuator operatively connected between the header wing section and the base structure, a load sensor, and a controller. The actuator is operative to move the header wing section relative to the base structure between a wing lowered position and a wing raised position. The load sensor is operatively connected to the header wing section. The controller is operatively connected to the load sensor and the actuator, and configured to acquire load sensor data from the load sensor to evaluate a magnitude of a gravitational load on the header wing section, and prevent the actuator from moving the header wing section towards the wing raised position if the magnitude of the gravitational load exceeds a predetermined threshold load value.

In another exemplary embodiment, there is provided an agricultural combine having a chassis and a header assembly attached to the chassis. The header assembly has a base structure, a header wing section, an articulated joint connecting the header wing section to the base structure, an actuator operatively connected between the header wing section and the base structure, a load sensor, and a controller. The actuator is operative to move the header wing section relative to the base structure between a wing lowered position and a wing raised position. The load sensor is operatively connected to the header wing section. The controller is operatively connected to the load sensor and the actuator, and configured to acquire load sensor data from the load sensor to evaluate a magnitude of a gravitational load on the header wing section, and prevent the actuator from moving the header wing section towards the wing raised position if the magnitude of the gravitational load exceeds a predetermined threshold load value.

The load sensor may be operatively connected to the actuator, and may be, for example, a pressure sensor or load sensor.

The header wing section may be a draper deck having a frame operatively connected to the base structure, one or more draper arms connected to the frame, and a conveyor supported on the one or more draper arms and configured to move crop material towards the base structure. The load sensor may be operatively connected to the draper arms.

In another embodiment, there is provided a method for controlling a header assembly for an agricultural vehicle having a base structure and a header wing section attached to the base structure by an articulated joint. The method includes determining a magnitude of a gravitational load on the header wing section, comparing the magnitude of the gravitational load to a predetermined load value, and sending a control signal to prevent the header wing section from being moved towards a raised position upon determining that the magnitude of the gravitational load is greater than the predetermined load value.

BRIEF DESCRIPTION OF THE DRAWINGS

Embodiments of inventions will now be described, strictly by way of example, with reference to the accompanying drawings, in which.

DETAILED DESCRIPTION OF THE DRAWINGS

Figure 1:
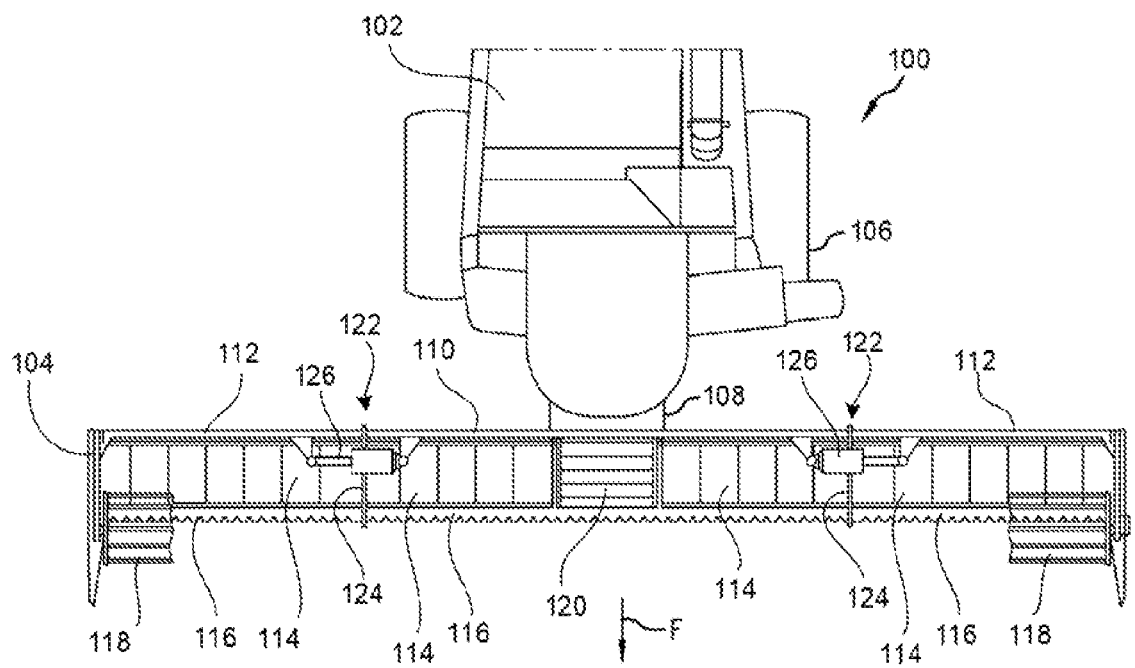
FIG. 1 is a partial top view of an example of an agricultural vehicle having an articulated header.

The drawing figures depict one or more implementations in accordance with the present concepts, by way of example only, not by way of limitations. In the figures, like reference numerals refer to the same or similar elements.

Referring now to the drawings, and more particularly to FIG. 1, there is shown an exemplary embodiment of an agricultural vehicle 100 in the form of a combine harvester which generally includes a chassis 102 and a header 104 carried by the chassis 102. The chassis 102 is supported on driving wheels 106 or tracks, as known in the art, and configured to move in a forward direction, illustrated as arrow F, during harvesting operations. For simplicity, only the front portion of the vehicle 100 is shown in the top view of FIG. 1.

The header 104 is connected to the chassis 102 by a mount 108. The mount 108 may comprise a feeder house or grain conveyor configured to collect crop material and direct it to the inner workings of the vehicle 100. Such inner workings typically will also include additional systems for the separation and handling of collected crop material, such as threshers, separators, grain elevators, a grain tank, a straw chopper and spreader, and so on. Such additional systems are known in the art and omitted from view for brevity of description. It should also be appreciated that the header 104 described and illustrated herein does not necessarily need to be included on a combine harvester, but can be incorporated in other agricultural vehicles such as mowers. The mount 108 may be a simple rigid connection or an articulated connection comprising one or more linkage arms and actuators (e.g., hydraulic pistons), as known in the art.

The header 104 includes a center section 110 and two wing sections 112. The wing sections 112 each may be connected at a proximal end thereof to the center section 110. The center section 110 and wing sections 112 may include any suitable operating mechanisms, such as mowers, seeders, tilling mechanism, and so on. In the shown embodiment, however, the center section 110 and wing sections 112 comprise a so-called draper head, in which each section 110, 112 includes a respective conveyor system 114, cutting system 116 and reel 118 (the reel 118 is partially omitted to show underlying parts more clearly). The conveyor systems 114 on the wing sections 112 are configured to move crop material towards the center section 110 (and the mount 108). The center section 110 has two conveyor systems 114 that move crop material received from the wing section 112 towards the mount 108. At the middle of the center section 110, there is a feeder conveyor 120 that collects the crop material from the conveyor systems 114 and directs it into the vehicle 100 for further processing. The conveyor systems 114 may comprise conveyor belts, augers, or the like. The cutting system 116 is provided to cut crop material from the ground, and the reel 118 to help hold, lift and move the crop material towards the conveyor systems 114. The general details and features of the conveyor systems 114, cutting systems 116 and reels 118 will be understood by persons of ordinary skill in the art, and need not be described herein in detail.

Figure 2:
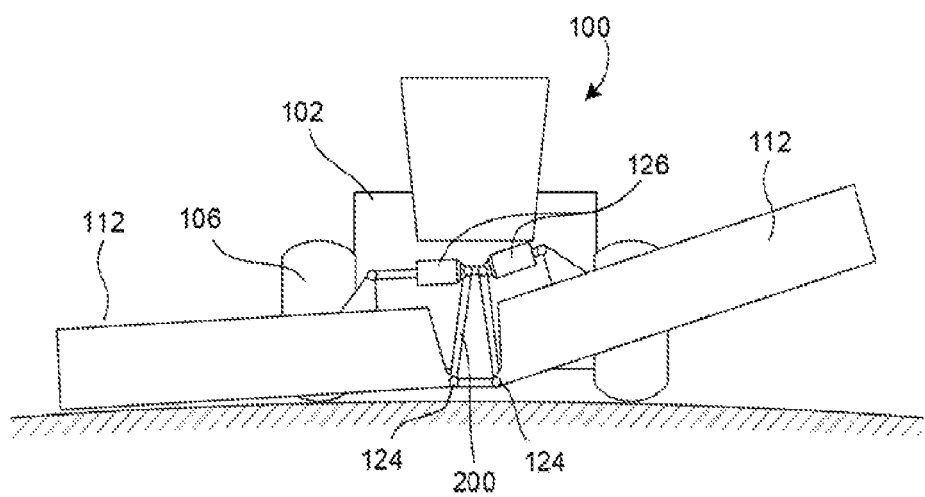
FIG. 2 is a schematic front view of another example of an agricultural vehicle having an articulated header.

The wing sections 112 are movably connected to the center section 110 by respective articulated joints 122. The articulated joints 122 allow the wing sections 112 to move, relative to the center section 110, between a lowered position and a raised position. The lowered position refers to the position of the wing section 112 when it is relatively close to the ground, and the raised position refers to the position of the wing section 112 when it is relatively far from the ground. For example, FIG. 2 shows a front view of the vehicle 100 and header 104 with the one wing section 112 on the left in a lowered position, and the other wing section 112 in a raised position. The precise range of travel may depend on operating requirements or other factors, but it is preferred that the wing sections 112 be movable upwards and downwards relative to a normal operating position that would be used on level ground. For example, a pivoting wing section 112 might be movable between a downward angle (e.g., 5 degrees downward as measured relative to a plane perpendicular to the gravitational direction) at the lowermost lowered position, and an upward angle (e.g., 30 degrees upwards as measured relative to a plane perpendicular to the gravitational direction) at the highest raised position. The range of motion for wing sections 112 that slide or translate without a corresponding pivoting motion may be specified as linear travel in the downward and upward direction (e.g., 10 inches downward from the normal position in the gravitational direction, and 30 inches upwards from the normal position in the gravitational direction).

Any type of articulated joints 122 may be used to provide relative movement between the wing sections 112 and the center section 110. For example, the articulated joints 122 may comprise pivot connectors 124 that are oriented with one or more pivot axes extending parallel to the forward direction F (see, e.g., U.S. Pat. Pub. No. 2019/0000014). The articulated joints 122 also may allow pivoting movement relative to the center section 110 about multiple axes of rotation (see, e.g., U.S. Pat. Pub. No. 2018/0303029). The articulated joints 122 also may comprise linkages to allow relative translational movement without corresponding relative angular movement, or angular movement about a virtual pivot axis (see, e.g., U.S. Pat. Nos. 9,992,924 and 10,070, 575). The articulated joints 122 also include respective control mechanisms, such as an actuator 126, to control the position of the wing section 112 relative to the center section 110 and mount 108, such as discussed in more detail below.

The actuators 126 may comprise any suitable movable linkage mechanism for moving the wing sections 112. In FIGS. 1 and 2, the actuators 126 are shown as pressurized actuators, such as pneumatic or hydraulic piston and cylinder assemblies that are operated by valves and a source of pressurized fluid (gas, oil, etc.). In this case, the piston/cylinder assembly provides a movable linkage in the form of a adjustable-length telescoping connector. The actuators 126 alternatively may comprise electric motors, pressure-operated rotational drives, and so on as the power supply, and other kinds of movable linkage to provide the desired controlled movement. For example, an electric motor may be provided to drive a worm gear that engages a corresponding nut to provide an alternative telescoping linkage. The actuator may be bidirectional (able to forcibly move the wing section 112 both up and down), or unidirectional (only able to lift the wing section 112, while lowering is achieved by gravity). A unidirectional actuator may, for example, be a motor and spool to selectively retract a cable to provide an upwards-only driving force to lift the wing section 112, or a single-acting hydraulic piston that is pressurized to apply a force to lift the wing section 112, and depressurized to allow gravity to drop the wing section 112. The actuators 126 also may include any suitable drive mechanisms to convert a motive force to the desired type of motion, such as gears, drive shafts, worm screws, and so on. These and other such actuators are known in the art, and need not be described in more detail herein.

One preferred embodiment includes a center section 110 and two wing sections 112, but other embodiments may include only two wing sections that are connected to the mount 108 by respective articulated joints 122 or other configurations. In another example, the wing section 112 may be mounted directly to the chassis 102. Thus, a mount 108, a center section 110, a chassis 102, or any other structure may provide a base structure to which the wing section 112 is attached. An example of an alternative configuration is shown in FIG. 2. Here, the mount 108 comprises a frame 200, and the articulated joints 122 each comprise a pivot connection 124 with a rotation axis extending parallel with the forward direction F, and an actuator 126 joining the proximal end of each wing section 112 to the frame 200. Each wing section 112 is configured to pivot about the respective pivot connection 124 under the control of the respective actuator 126, which extends and contracts to move the wing section 112 between the lowered position (shown on the left), and the raised position (shown on the right). Other embodiments may have any desirable combination of wing sections and center sections, such as a center section and a single wing section, or only a wing section (such as in a highway embankment mower configuration) to provide offset harvesting.

Headers having wing sections 112 are subject to loading forces that can potentially damage the header or other parts of the vehicle to which the header is attached. For example, it is possible for the cutting system 116 or other operative parts of the wing section 112 to strike the ground when passing over undulating terrain.

One at least partial solution to this problem is to provide ground supports, such as fixed or movable wheel assemblies, at locations along the span of the wing section 112. However, such supports can interfere with harvesting and complicate the structure, and can reduce the ability to conform the orientation of the wing section 112 to the ground in some circumstances.

Another partial solution to this problem is to provide feedback sensors to help determine when the wing section 112 is getting too close to the ground, and signal the actuator 126 to lift the wing section 112. For example, height detecting sensors (pivoting wheels mounted to potentiometers, sonar rangefinders, radar rangefinders, infrared proximity sensors, etc.) can be used to measure distance to the ground. However, such sensors can be confounded by the presence of crop material, and might not provide an accurate measurement when the wing section 112 is subject to torsional loads that tilt the sensor forward or backwards along the direction of travel.

Another partial solution is to provide a load sensor that measures a backwards force on the wing section 112 (i.e. force opposite to the direction of travel) to determine when the wing section 112 is too close to or in contact with the ground, and then signal to lift the wing section 112 or slow the vehicle when such events occur. One such device is discussed in U.S. Pat. No. 9,668,412. However, the use of a load sensor to measure deflection of an elongated body such as a draper header wing section 112 can be subject to errors caused, for example, by complex loading on the wing section 112 (e.g., combined compression, drag and bending as might occur upon oblique contact with the ground or an obstacle). Furthermore, the inventors have found that controlling the wing section 112 to raise when it experiences an excessive load can at least momentarily increase loading on the wing section 112 to a point where the act of lifting the wing section 112 causes more damage than it avoids.

The inventors have found that these shortcomings can be addressed, at least in part, by a wing section control system that detects excess loading on the wing section, and issues an instruction to slow or stop the vehicle without lifting the wing section. It has also believed that direct measurement of wing section deflection can provide more accurate and useful data to assist with controlling the operation of the header.

Figure 3:
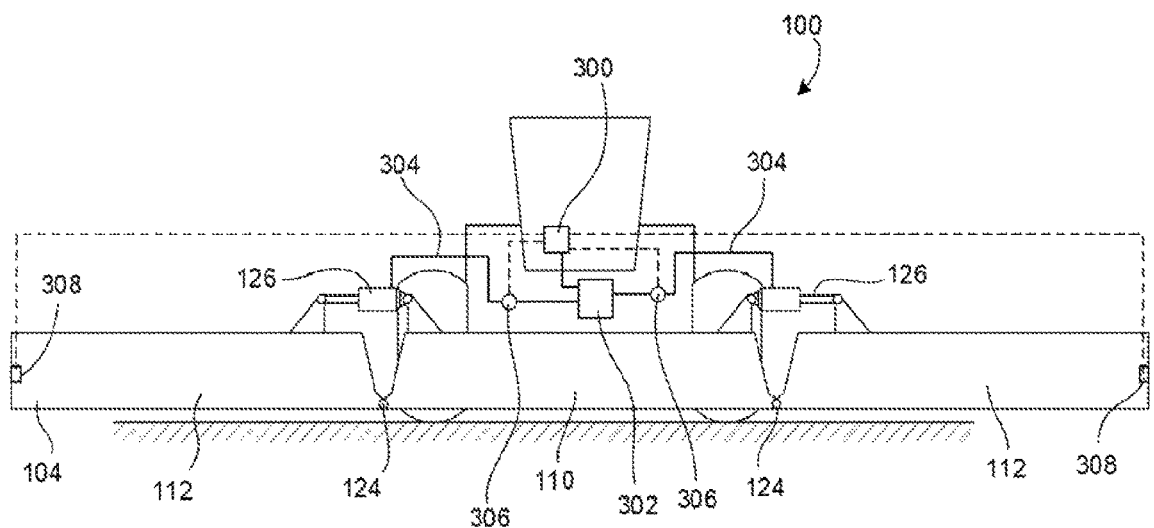
FIG. 3 is a schematic front view of a combine and articulated header, showing a control system and associated sensors.

An exemplary control system 300 and related features for a header 104 for an agricultural vehicle 100 are shown in FIG. 3. In this case, the header 104 again comprises a center section 110 and two wing sections 112. As before, the wing sections 112 are connected to the center section 110 by respective articulated joints 122 having pivot connections 124 and controllable actuators 126.

Each actuator 126 comprises a pressurized actuator, such as a hydraulic piston and cylinder, which may be a single-acting actuator configured to raise the wing section 112 upon application of increased pressure, and drop the wing section 112 upon reduction of the pressure in the cylinder. Each actuator 126 is operatively connected to a hydraulic controller 302 via one or more respective control lines 304. The hydraulic controller includes of pressurized hydraulic fluid (e.g., a pump or pressurized reservoir), valves and other features used to control the displacement of fluid to control the operation of the actuators 126, as known in the art. The control system 300 is operatively connected to the hydraulic controller 302 and configured to issue commands to drive the hydraulic controller 302 to articulate the actuators 126 as desired.

Each wing section 112 also includes a load sensor 306 to evaluate a gravitational load (i.e., load in the global vertical direction) on the wing section 112. In this case, the load sensors 306 comprise pressure sensors that are operatively connected to a respective actuator 126, and configured to detect changes in pressure in the respective actuator 126 and/or control line 304. Thus, the load sensors 306 are able to detect increases in loading on the wing section 112 by measuring pressure increases exceeding the control pressure provided by the hydraulic controller 302 (i.e., backpressure). The load sensors 306 preferably are configured to predominantly read gravitational load, but it will be appreciated that forces applied to the wing section 112 in other directions also may be detected by the load sensors 306 without significantly affecting the operation of the system. Other embodiments of load sensors 306 are discussed in more detail below. The load sensors 306 are operatively connected to the control system 300 by low-voltage wiring, wireless communication, or the like.

Each wing section 112 also may include a deflection sensor 308 configured to provide a measure of how much the wing section 112 has moved relative to the center section 110. The deflection sensors 308 may provide an indirect indication of deflection by measuring stresses or loading on the various parts of the header 104, as described in U.S. Pat. No. 9,668,412, but in a more preferred embodiment the deflection sensors 308 are configured to directly measure wing section deflection, such as discussed in more detail below. The deflection sensors 308 are also operatively connected to the control system 300 via low voltage wires, wireless communication or other known electrical connections.

Figure 4:
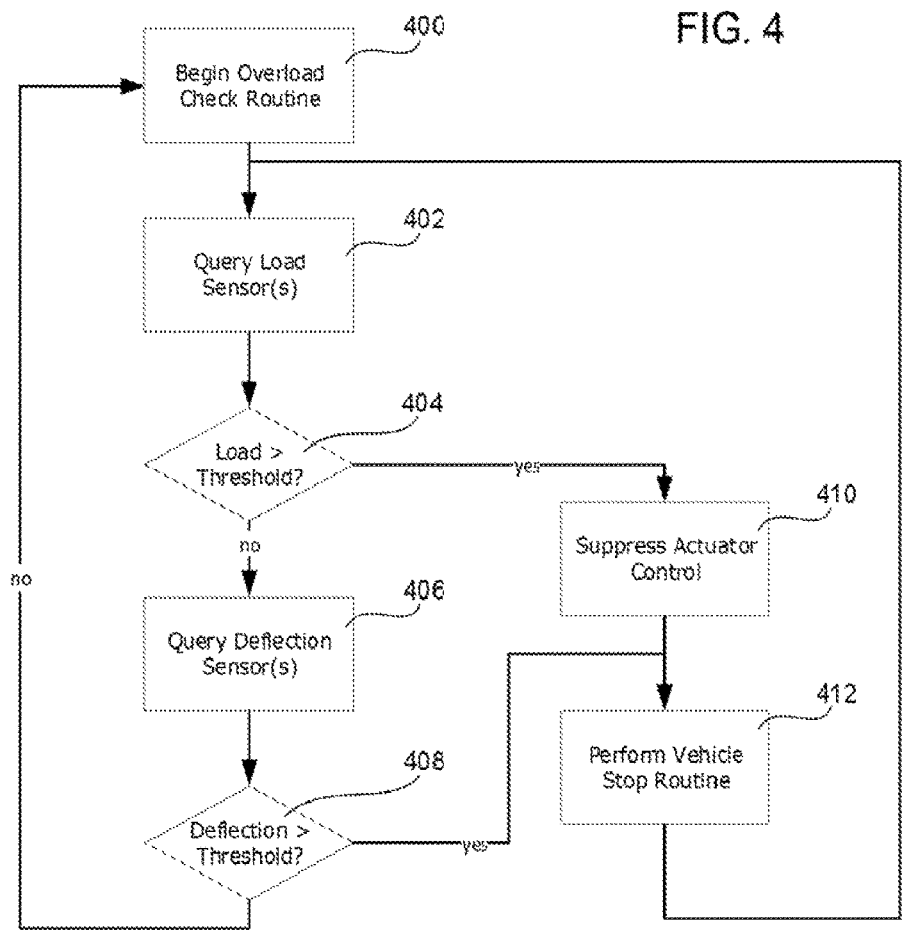
FIG. 4 illustrates an example of a control system operating algorithm.

An exemplary operation of the control system 300 is illustrated in FIG. 4.

In step 400, the control system 300 begins an overload check routine.

At step 402, the control system acquires load sensor data by obtaining readings from the one or more load sensors 306. Any type of filtering, amplification, or other pre-processing may be used during data acquisition. The load sensor data also may comprise a single discrete value (e.g., a single pressure sensor reading), or a collection of multiple readings (e.g., a time-stamped sequence of pressure sensor readings, an integrated sum of pressure sensor readings over a fixed sampling time, etc.).

At step 404, the control system 300 compares the load sensor data with a predetermined threshold load value to determine whether any of the load sensors 306 has exceeded the threshold load value. The threshold load value may be any value selected to represent an operation limit for the header, a value representative of a ground strike, or any other value. The threshold value also may be altered by an operator to account for different operating conditions (e.g., a lower threshold when harvesting lighter crop) or based on other considerations (e.g., calibrating or fine-tuning). The determination in step 402 may comprise a simple numerical comparison comparing an instantaneous sensor reading with a threshold value, or it may involve substeps such as filtering input data values, integrating input data values over time, averaging a set of values, evaluating data trends, and so on. The threshold value itself may be a simple number representing an output data value (e.g. a pressure value, if a pressure sensor is used), or a number or equation representing a mathematical manipulation of the output data (e.g., a value of slope of a curve to indicate a sudden change in value; a Fourier transformation to indicate fluctuations at particular vibration frequencies; etc.). Other alternatives and variations will be apparent to persons of ordinary skill in the art in view of the present disclosure.

If the control system 300 determines that the load sensor data does not exceed the threshold load value, the process continues to step 406. In step 406, the control system acquires deflection sensor data from the one or more deflection sensors 308. As with the load sensor data, the deflection sensor data may be pre-processed, and may include single data points or collections of multiple data points collected over time.

Next, in step 408, the control system 300 compares the deflection sensor data with a predetermined threshold deflection value to determine whether the threshold deflection value has been exceeded. As with step 404, this process may compare single values, integrated values, slope data, frequency domain data, and so on.

If the threshold deflection value has not been exceeded, then the process returns to begin again to provide constant or near-constant monitoring for overload conditions.

If the control system 300 determines that one or both of the threshold load value and the threshold deflection value is exceeded, it proceeds to take corrective measures. For example, if the threshold load value is determined to have been exceeded, the control system 300 may proceed to process step 410, in which the control system 300 issues a control signal to suppress actuator control. This control signal prevents or limits the ability of the operator or an automated control system to operate the actuator 126 to raise the wing section 112 that has experienced the overload condition. For example, this control signal can prevent any elevation of the wing section 112, prevent elevation of the wing section 112 at a rate greater than a predetermined elevation rate, or lower the wing section 112. As indicated above, this action is expected to help prevent excessive damage that might occur when an operator or automated system attempts to raise an overloaded wing section 112.

Upon detecting a load sensor overload condition, the control system 300 also may perform a vehicle stop routine 412. In this step, the control system 300 issues a control signal to cause the vehicle 100 to slow down and stop at a predetermined rate. Such commands may be provided to the vehicle wheel drive system or brakes, and may comprise any suitable action (e.g., reduce throttle opening; terminate spark ignition; activate brakes, etc.). The vehicle stop routine 412 also may include steering control commands to cause the vehicle 100 to turn towards the affected wing section 112, such that less of the vehicle motion is transferred to the distal end of the affected wing section 112. For example, the vehicle stop routine 412 can issue a steering command to turn the steered wheels to an angle at which the vehicle's turn center is located at or near the distal end of the affected wing section. Such angle may be readily determined by evaluating the geometric configuration of the vehicle 100 and header 104.

The control system 300 also may issue the same or similar corrective commands upon detecting a deflection overload condition in step 408. For example, upon registering a deflection overload in step 408, the control system 300 may proceed to step 410 and 412. Alternatively, as shown by example in FIG. 4, the control system 300 may take a different approach to addressing a deflection overload, such as by proceeding directly to a vehicle stop routine 412 without suppressing elevation of the wing section. In another embodiment, if a deflection overload is detected in step 408 without also detecting a gravitational load overload in step 404, the control system 300 may issue a command to raise the affected wing section 112 and may not begin the vehicle stop routine 412 at all.

Other corrective actions that might be taken include, but are not limited to: illuminating a warning light in the vehicle cabin, activating an audible warning signal, terminating operation of draper conveyor motors, terminating operation of reels, terminating operation of a cutting system, or terminating other vehicle or header operations. The control system 300 also may maintain a continuous record of load and deflection readings, or may store overload readings into an error file. The control system 300 further may be configured to send error or incident reports to a remote computing center via wireless communication (cellular or the like), to maintain an operation record of the header and vehicle systems.

As shown in the logical flow path in FIG. 4, the control system 300 may continue to monitor the load sensors 306 and deflection sensors 308 after corrective steps have been taken. If and when the sensors stop indicating overload conditions, the control system 300 may return the vehicle to normal operation. However, the control system 300 may require the operator to perform actions to verify that no potentially-harmful conditions remain before allowing the vehicle and header to resume normal operation.

It is also envisioned that the control system 300 can operate with a tiered reaction structure to take different corrective actions depending on the magnitude of the wing section's detected load state or deflection. For example, the control system 300 could suppress actuator control by limiting the rate at which the wing section 112 can be elevated if the load sensor indicates a moderately high loading, and prevent any elevation of the wing section 112 if the load sensor indicates a very high loading. Other alternatives and variations will be apparent to persons of ordinary skill in the art in view of the present disclosure.

The shown arrangement of steps is not strictly required. In use, the control system 300 may periodically or essentially continuously (i.e., at a maximum clock cycle of the controller system's processor) monitor the output of one or both of the load sensors 306 and the deflection sensors 308. The control system 300 also may operate completely separate processes to detect load and deflection data, or may not detect both load and deflection data (e.g., only detecting load data). The control system 300 further may perform alternative corrective actions or perform the actions in a different order. The control system 300 also may comprise a hierarchical control system that uses an arbitrator to control operations of the header and vehicle based on output of a variety of sensors. For example, the control system 300 may allow a driving routine (i.e., allowing the operator to control vehicle speed) to continue unless an overload signal is received from the load sensors 306, at which time the control system arbitrator will cause the control system to enter a drive shut down mode. Such control algorithms and schemes can be implemented in virtually any variety without departing from the basic processes of querying sensors and making control adjustments as described herein, and the invention is not intended to be limited to any particular control scheme.

Figure 5:
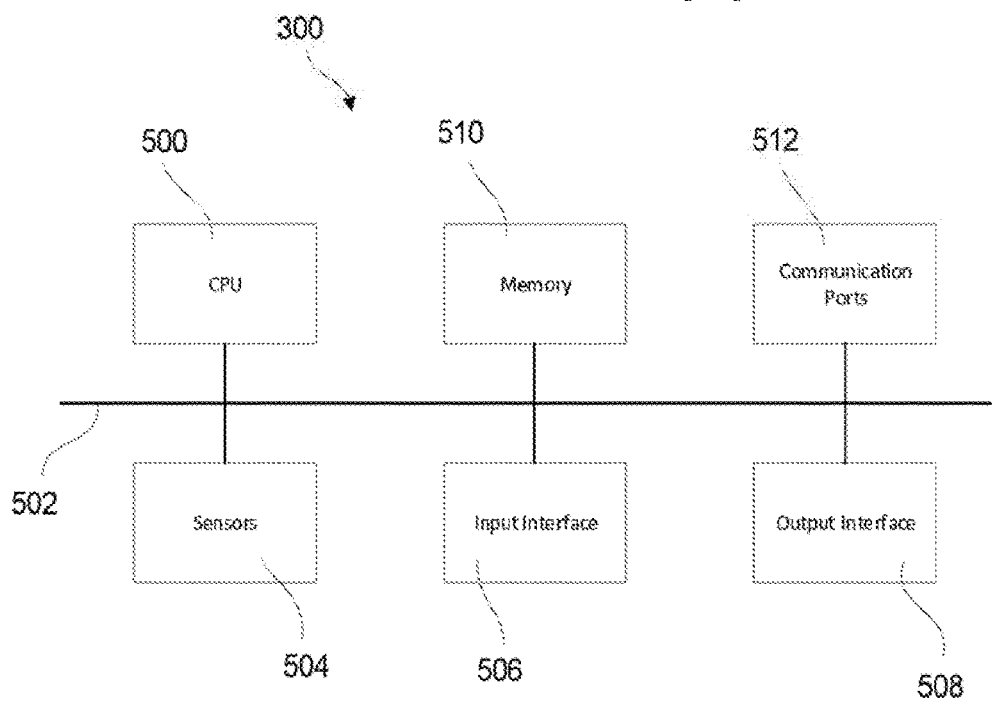
FIG. 5 is a schematic view of a control system.

The control system 300 may be implemented using any suitable arrangement of processors and logical circuits. FIG. 5 is a block diagram of exemplary hardware and computing equipment that may be used as a control system 300 as discussed herein. The control system 300 includes a central processing unit (CPU) 500, which is responsible for performing calculations and logic operations required to execute one or more computer programs or operations. The CPU 500 is connected via a data transmission bus 502, to sensors 504 (e.g., load sensors 306 and deflection sensors 308), an input interface 506, an output interface 508, and a memory 510. The input and output interfaces 506, 508 may comprise any suitable user-operable and perceivable system, such as a touchscreen controller/display, control knobs or joysticks, and the like. One or more analog to digital conversion circuits may be provided to convert analog data from the sensors 504 to an appropriate digital signal for processing by the CPU 500, as known in the art. The CPU 500 also may be operatively connected to one or more communication ports 512, such as serial communication ports, wireless communication ports, or the like.

The CPU 500, data transmission bus 502 and memory 510 may comprise any suitable computing device, such as an INTEL ATOM E3826 1.46 GHz Dual Core CPU or the like, being coupled to DDR3L 1066/1333 MHz SO-DIMM Socket SDRAM having a 4 GB memory capacity or other memory (e.g., compact disk, digital disk, solid state drive, flash memory, memory card, USB drive, optical disc storage, etc.). The selection of an appropriate processing system and memory is a matter of routine practice and need not be discussed in greater detail herein.

It will be appreciated that the manner in which the gravitational load and deflection of the wing sections 112 are determined may be different for different embodiments. For example, alternative embodiments of load sensing systems are shown in FIGS. 6 and 7.

Figure 6:
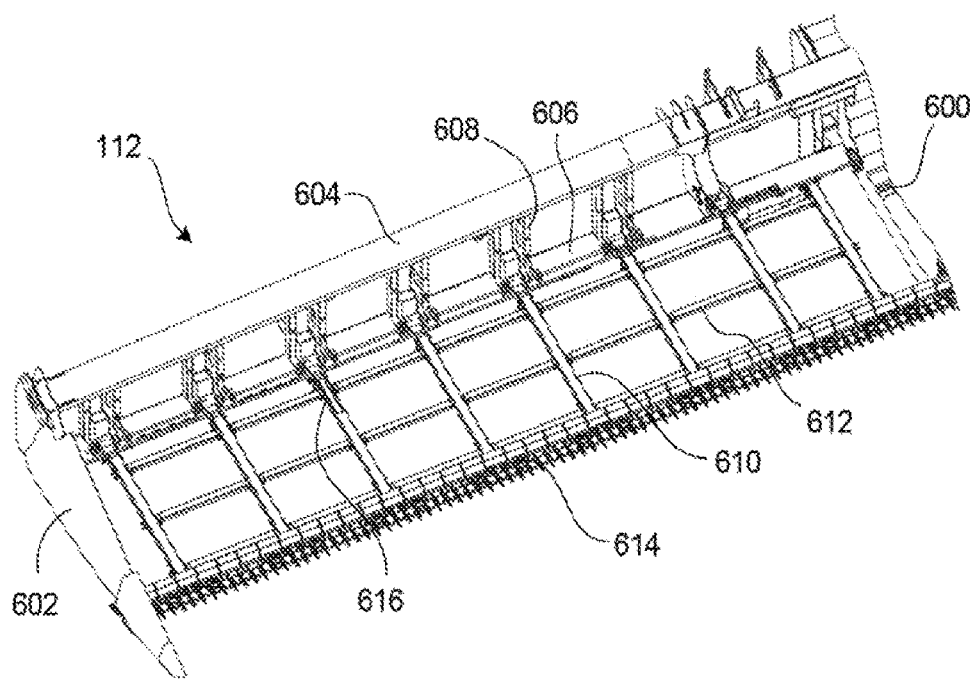
FIG. 6 is an isometric view of an exemplary header wing section showing the frame, draper arms and other parts.
Figure 7:
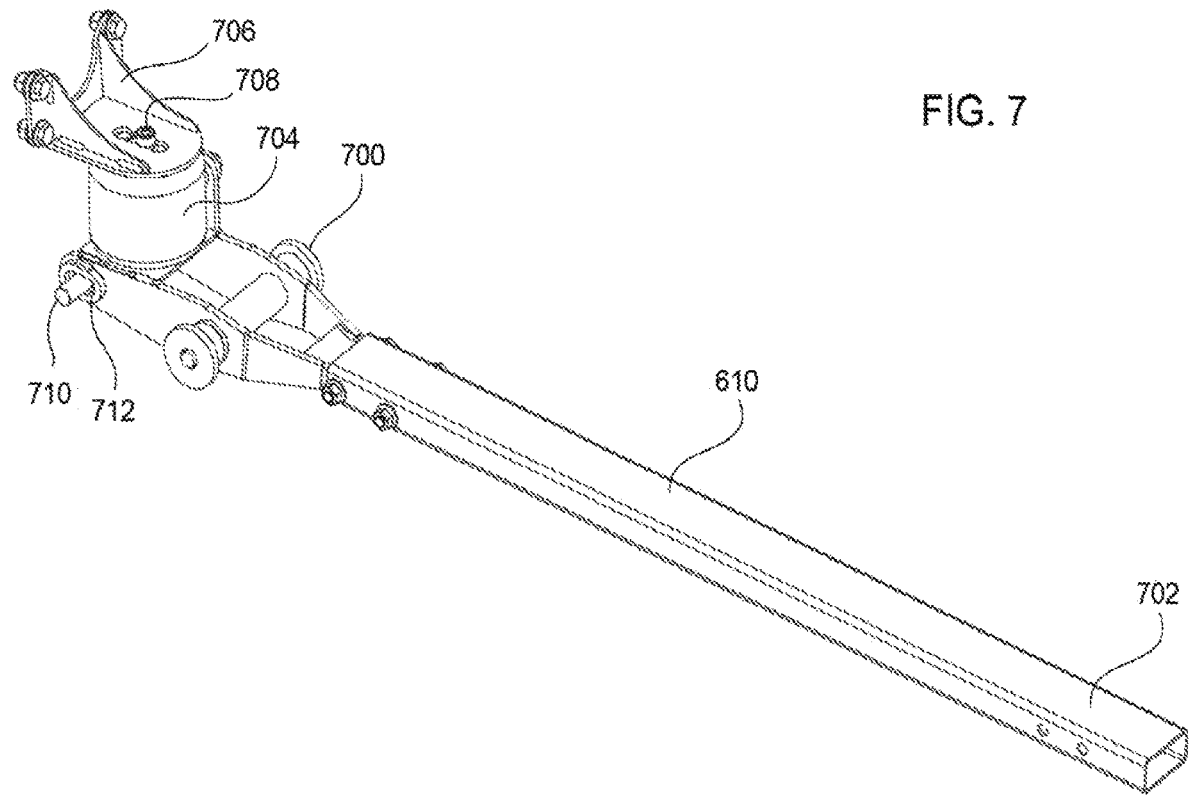
FIG. 7 is an isometric view of a draper arm and related parts from FIG. 6.

FIG. 6 illustrates an exemplary wing section 112 provided in the form of a draper head. The wing section 112 is shown with external covers and some other features omitted for the sake of simplifying explanation of the relevant parts. The wing section 112 extends from a proximal end 600, which is attached to a center section 110 or mount 108, to a distal end 602. The main structural body of the wing section 112 is formed by a frame having an upper frame member 604 and a lower frame member 606, which are connected to one another by struts 608. The upper and lower rails 604, 606 connect at the proximal end 600 to an articulated joint having an actuator, such as described above, and support the remaining parts of the wing section 112.

The frame supports a draper deck assembly. The draper deck assembly includes a plurality of draper arms 610 that extend in the forward drive direction from the frame. The draper arms 610 may be connected to one another by lateral supports 612. A cutting system 614 is attached to the fronts of the draper arms 610. A conveyor, such as a conveyor belt or auger is provided on the draper arms 610, as known in the art, but this feature is not shown in FIGS. 6 and 7 for the sake of clarity.

The draper arms 610 may be configured to move in the vertical direction relative to the frame, in order to position the cutting system 614 at the desired cutting height. For example, as shown in FIGS. 6 and 7, the draper arms 610 may have a pivot axle 700 that is connected to a corresponding mount on the lower frame member 606. This pivot 700 provides an axis of rotation that extends perpendicular to the forward direction and parallel to the ground, and motion about this axis causes the front end 702 of the draper arm 610 to move up and down. The position of the draper arm 610 is controlled by an actuator, which in this case is a pneumatic airbag 704. At one end, the airbag 704 is connected to the frame by a mount 706, which is rigidly attached to the strut 608 or elsewhere on the frame. The other end of the airbag 704 is connected to the draper arm 610 at a location offset from the pivot axle 700. The airbag 704 is connected by a fitting 708 to a source of pressurized gas (not shown). Changing the pressure of the gas causes the airbag 704 to expand or contract, which causes the draper arm 610 to rotate about pivot axle 700 to provide the desired vertical control of the cutting system 614. The range of motion of the draper arm 610 may be controlled by a pin 710 that is rigidly connected to the frame and fitted into in a corresponding slot 712 in the draper arm 610.

In this embodiment, the gravitational load on the wing section 112 can be determined by evaluating the pressure of the gas in the pneumatic airbags 704. This load detection is similar to the load detection described above in relation to using pressure in the actuator 126 hydraulic line. For example, a pressure sensor may be provided in the airbag 704 or its pneumatic supply line, and monitored to detect pressures above an expected value for normal operation.

This embodiment is expected to have certain advantages over measuring load via pressure changes in a wing section lifting actuator 126. For example, if multiple pressure sensors are used at different airbags 704, fluctuations in gravitational load may be detected at multiple locations along the length of the wing section 112 to provide a more accurate assessment of potentially hazardous conditions. In this configuration, a control system 300 can evaluate whether there is a large load on only a few draper arms 610, which might indicate a sudden influx of dirt and crop material when the wing section 112 strikes a localized high spot on the ground. The control system 300 can also differentiate between a dangerous excessive loading near the distal end 602 of the wing section 112 and a potentially less problematic application of the same magnitude of loading at the proximal end 600 of the wing section 112.

Detecting the load on the draper arms 610 also helps isolate the load measurement from loads that might be applied directly to the frame. This can be particularly helpful if the wing section 112 is constructed such that the draper arms 610, cutting system 614 or conveyor/auger are relatively sensitive to high loading but the frame itself is not likely to be damaged by a high load. This arrangement can also reduce the amount of non-gravitational loading that might be detected by the load sensors.

This embodiment also allows the control system to separately control the draper arm 610 actuators during an overload condition. For example, the control system can monitor the output of the load sensors, and issue a command to suppress raising the draper arms 610 from a lowered arm position to a raised arm position upon determining that the draper arms 610 are experiencing an excessive load. Such a command may be issued in parallel with the suppression step 410 discussed above in relation to FIG. 4, or as part of a separate control algorithm.

It will be appreciated that, in other embodiments, the airbags 704 and particular structure of the draper arms 610 may be modified or replaced. For example, the draper arms 610 may be replaced by panels, or the airbags 704 may be replaced by electric or hydraulic motors, or other pressurized actuators such as hydraulic piston and cylinder assemblies. The draper arms 610 also may be interconnected and operated by a single actuator. It will also be appreciated that the draper arms 610 may be connected to the frame by different connections, such as a flexible leaf spring, a multiple-bar linkage, or the like. Other alternatives and variations will be apparent to persons of ordinary skill in the art in view of the present disclosure.

While the example of FIGS. 6 and 7 uses adjustable draper arms 610, other embodiments may use fixed draper arms 610. For example, the airbag 704 shown in FIG. 7 may be a sealed container forming a pneumatic spring, and pressure within the container can be measured to determine gravitational load. As another example, the draper arms 610 may be rigidly connected to the frame, and load may be detected by strain gauges 616 located on the draper arms 610 or frame.

In other cases (whether the draper arms 610 are fixed or movable), gravitational load may be determined using load cells between the draper arms 610 and the conveyor or auger, strain gauges located on the uprights 608 or other parts of the frame, or using other configurations of load cells or the like. As used herein, load cells are any mechanism used to measure physical load on a part, including strain gauges, electrical resistance-based measuring device (e.g., potentiometers), piezoelectric devices, and so on. In still other cases, the gravitational load may be determined by evaluating the operating properties of a motor driving the conveyor. For example, an electric conveyor belt or auger motor may be monitored to evaluate back electromotive force or current draw to evaluate changes in load caused by an influx of material onto the belt or auger, and similar techniques may be used by monitoring pressure required to operate a hydraulic motor at a constant speed. Other alternatives and variations will be apparent to persons of ordinary skill in the art in view of the present disclosure.

Figure 8:
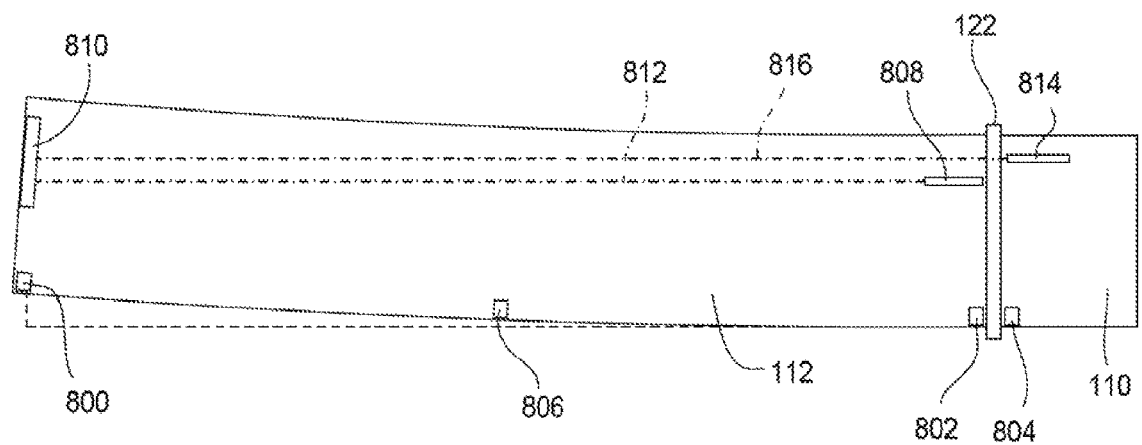
FIG. 8 is a schematic top view of a header wing section shown in deflection.

Referring now to FIG. 8, examples of direct-measurement deflection sensors 308 are described in more detail. As noted above, deflection of a wing section 112 may be evaluated, with some degree of accuracy, by using strain gauges or load cells to evaluate stresses on the wing section 112 or its mounting point to a center section 110 or a mount 108. However, such measurements are not necessarily as accurate as measurements provided by direct evaluation of the wing section's position. FIG. 8 shows two examples of sensor systems that directly measure wing section deflection, and which may provide improved measurement results.

FIG. 8 is a top view showing a wing section 112 mounted to a center section 110 by an articulated joint 122. The wing section 112 is deflected backwards from the forward travel direction relative to a resting or normal operating position (dashed line). A first example of a deflection sensor is shown in the form of a motion sensor 800 located at or near the distal end of the wing section 112. The motion sensor 800 may comprise, for example, a solid state electronic 9-axis accelerometer/gyroscope such as the MPU-9250 chip-based sensor provided by TDK InvenSense of San Jose, Calif. The motion sensor 800 comprises accelerometers that are capable of detecting linear motion and rotation relative to multiple different axes, and output of the motion sensor 800 can be used to evaluate the position of the distal end of the wing section 112. The motion sensor 800 may be used in conjunction with a reference motion sensor 802 located at the proximal end of the wing section, and/or a reference motion sensor 804 located on the center section 110 or elsewhere on the vehicle system (e.g., on the chassis 102 or mount 108). Using the reference motion sensor 802, 804 as a frame of reference, the output of the motion sensor 800 at the end of the wing section 112 provides a direct measurement of the displacement of the motion sensor 800 and the portion of the wing section 112 to which it is attached. If desired, additional motion sensors 806 may be provided at other locations along the wing section 112 to provide more detailed deflection information.

Another example of a deflection sensor is shown as an optical path sensor having an emitter and a detector. The emitter may be a source of focused light, such as a collimated light beam or a laser 808. For example, a laser 808 may be located at the proximal end of the wing section 112, and oriented to direct its beam 812 onto a sensor 810 located at the distal end of the wing section 112. The laser may comprise any suitable light-emitting source, as are well-known in the art. The detector may comprise any photosensitive detector that is capable or determining displacement of the detected light. For example, the detector may be a laser sensor 810 comprising a multiple-pixel charged-coupled device (CCD) or complementary metal-oxide semiconductor (CMOS) camera sensor having different sensor locations to track the position of the beam, or the like. The laser sensor 810 also may comprise a series of individual light detectors (e.g., photodiodes), that are positioned along a reference surface. The laser sensor 810 also may be positioned adjacent the laser 808, and a mirror may be located at the end of the wing section 112. As another example, the laser sensor 810 may comprise a simple photodetector, and a retroreflective mirror may be located at the end of the wing section 112 and positioned such that the laser beam 812 strikes the mirror when the wing section 112 is within (or alternatively outside) an acceptable deflection range, to thereby indicate whether the threshold deflection has been reached in a binary sense (i.e., either the reflected beam is detected or it is not). The positions of the emitter and detector can also be reversed, if desired.

A laser 814 also may be located on the center section 110 (or mount), but in this case provision might have to be made to account for the fact that the wing section 112 will be moving up and down relative to the laser 814 during normal operation. Such normal operating motion can be addressed by mounting the laser 814 on a pivot to follow the motion of the wing section 112, using a laser sensor 810 that is insensitive to the vertical position of the laser's beam 816 (e.g., a CMOS sensor that extends vertically and in the fore-aft direction), or modulating the laser's beam 816 into a vertically-oriented fan shape that projects onto the laser sensor 810 throughout the normal range of motion of the wing section 112. Other alternatives and variations will be apparent to persons of ordinary skill in the art in view of the present disclosure.

Although shown collectively in FIG. 8, it will be understood that embodiments may use any one, or any combination of such displacement sensors, or other kinds of displacement sensors.

Embodiments may be provided in various forms. In one instance, an embodiment may comprise an entire vehicle and header assembly, and the control system may be integrated into the header or into the vehicle. In another instance, an embodiment may comprise a segmented header and an associated control system. In another instance, an embodiment may comprise a single header wing section and an associated control system. Other configurations may be used in other embodiments.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A header for an agricultural vehicle, the header comprising:
   a base structure;
   a header wing section;
   an articulated joint connecting the header wing section to the base structure;
   an actuator operatively connected between the header wing section and the base structure, the actuator being operative to move the header wing section relative to the base structure between a wing lowered position and a wing raised position;
   a load sensor operatively connected to the header wing section; and
   a controller operatively connected to the load sensor and the actuator, the controller being configured to acquire load sensor data from the load sensor to evaluate a magnitude of a gravitational load on the header wing section, and prevent the actuator from moving the header wing section towards the wing raised position if the magnitude of the gravitational load exceeds a predetermined threshold load value.

2. The header of claim 1, wherein the actuator comprises a pressurized actuator and the load sensor comprises a pressure sensor associated with the actuator.

3. The header of claim 2, wherein the pressurized actuator comprises one or more hydraulic or pneumatic piston and cylinder assemblies.

4. The header of claim 1, wherein the load sensor comprises one or more load cells connected to the actuator.

5. The header of claim 1, wherein the header wing section comprises a draper deck having:
   a frame operatively connected to the base structure;
   one or more draper arms connected to the frame; and
   a conveyor supported on the one or more draper arms and configured to move crop material towards the base structure,
   wherein the load sensor is operatively connected to the one or more draper arms.

6. The header of claim 5, wherein:
   the one or more draper arms are movably connected to the frame and movable by one or more pressurized actuators between an arm lowered position and an arm raised position, and
   the load sensor comprises one or more pressure sensors configured to detect a respective pressure in the one or more pressurized actuators.

7. The header of claim 5, wherein the load sensor comprises one or more load cells connected to the one or more draper arms.

8. The header of claim 1, wherein the base structure comprises a header center section.

9. The header of claim 1, further comprising a deflection sensor operatively connected to the controller and the header wing section, the controller being configured to acquire deflection sensor data from the deflection sensor to evaluate a magnitude of a relative movement between the base structure and the header wing section, and transmit a control instruction to slow or stop movement of the header if the magnitude of the relative movement exceeds a predetermined threshold deflection value.

10. The header of claim 9, wherein the deflection sensor comprises at least one of:
    a respective accelerometer located on each of the base structure and the header wing section, and
    an optical path sensor comprising an emitter configured to direct a beam of light along a length of the wing section, and a detector configured to determine a displacement of the beam of light from a starting position.

11. An agricultural combine comprising:
    a chassis, and
    a header assembly attached to the chassis, the header assembly comprising:
      a base structure;
      a header wing section;
      an articulated joint connecting the header wing section to a mount;
      an actuator operatively connected between the header wing section and the base structure, the actuator being operative to move the header wing section relative to the base structure between a wing lowered position and a wing raised position;
      a load sensor operatively connected to the header wing section; and
      a controller operatively connected to the load sensor and the actuator, the controller being configured to acquire load sensor data from the load sensor to evaluate a magnitude of a gravitational load on the header wing section, and prevent the actuator from moving the header wing section towards the wing raised position if the magnitude of the gravitational load exceeds a predetermined threshold load value.

12. The agricultural combine of claim 11, wherein load sensor comprises a pressure sensor or a load cell associated with the actuator.

13. The agricultural combine of claim 11, wherein the header wing section comprises a draper deck having:
    a frame operatively connected to the base structure;
    one or more draper arms connected to the frame; and
    a conveyor supported on the one or more draper arms and configured to move crop material towards the base structure,
    wherein the load sensor is operatively connected to the one or more draper arms.

14. The agricultural combine of claim 13, wherein:
the one or more draper arms are movably connected to the frame and movable by one or more pressurized actuators between an arm lowered position and an arm raised position, and
the load sensor comprises one or more pressure sensors configured to detect a respective pressure in the one or more pressurized actuators.

15. The agricultural combine of claim 13, wherein the load sensor comprises one or more load cells connected to the one or more draper arms.

16. The agricultural combine of claim 11, wherein the base structure comprises a header center section.

17. The header assembly of claim 11, further comprising a deflection sensor operatively connected to the controller and the header wing section, the controller being configured to acquire deflection sensor data from the deflection sensor to evaluate a magnitude of a relative movement between the base structure and the header wing section, and transmit a control instruction to slow or stop movement of the header assembly if the magnitude of the relative movement exceeds a predetermined threshold deflection value.

18. A method for controlling a header assembly for an agricultural vehicle having a base structure and a header wing section attached to the base structure by an articulated joint, the method comprising:
determining a magnitude of a gravitational load on the header wing section;
comparing the magnitude of the gravitational load to a predetermined load value; and
sending a control signal to prevent the header wing section from being moved towards a raised position upon determining that the magnitude of the gravitational load is greater than the predetermined load value.

19. The method of claim 18, further comprising:
sending a control signal to cause the agricultural vehicle to stop upon determining that the magnitude of the gravitational load is greater than the predetermined load value.

20. The method of claim 18, further comprising:
determining a magnitude of a deflection of the wing section relative to the base structure;
comparing the magnitude of the deflection of the wing section to a predetermined deflection value; and
sending a control signal to cause the agricultural vehicle to stop upon determining that the magnitude of the gravitational load is greater than the predetermined load value.

* * * * *